(12) United States Patent
Shao et al.

(10) Patent No.: US 8,412,846 B2
(45) Date of Patent: Apr. 2, 2013

(54) WIRELESS NETWORK SYSTEM FOR EFFICIENTLY DELIVERING MULTIMEDIA MESSAGES

(75) Inventors: Xiaoling Shao, Shanghai (CN); Lei Feng, Shanghai (CN); Jiawen Tu, Shanghai (CN)

(73) Assignees: Koninklijke Philips Electronics N.V., Eindhoven (NL); Sharp Corporation, Osaka (JP)

( * ) Notice: Subject to any disclaimer, the term of this patent is extended or adjusted under 35 U.S.C. 154(b) by 973 days.

(21) Appl. No.: 10/536,919

(22) PCT Filed: Nov. 24, 2003

(86) PCT No.: PCT/IB03/05382
§ 371 (c)(1),
(2), (4) Date: Feb. 21, 2006

(87) PCT Pub. No.: WO2004/052033
PCT Pub. Date: Jun. 17, 2004

(65) Prior Publication Data
US 2006/0142029 A1 Jun. 29, 2006

(30) Foreign Application Priority Data
Dec. 3, 2002 (CN) .................................. 02 1 55752

(51) Int. Cl.
*G06F 15/16* (2006.01)
(52) U.S. Cl. ...................... 709/245; 455/412.1; 370/338; 370/474; 370/475
(58) Field of Classification Search ................... 709/245; 370/474–475, 338; 455/412.1
See application file for complete search history.

(56) References Cited

U.S. PATENT DOCUMENTS
6,167,040 A * 12/2000 Haeggstrom .................. 370/352
6,522,641 B1 * 2/2003 Siu et al. ........................ 370/338
(Continued)

FOREIGN PATENT DOCUMENTS
WO 0217650 A1 2/2002
WO WO 02/17650 A1 2/2002

OTHER PUBLICATIONS
3GPP TS 23.140 v4.4.0 (Sep. 2001) (3rd Generation Partnership Project; Technical Specification Group Terminals; Multimedia Messaging Service (MMS); Functional description; Stage 2 (Release 4).*

(Continued)

*Primary Examiner* — Yves Dalencourt
*Assistant Examiner* — Michael C Lai

(57) ABSTRACT

The present invention provides a wireless network system that enables direct wireless delivery of a multimedia message from a first MMS user agent to a second MMS user agent. In accordance with one embodiment of the invention, the wireless network system includes a MMS server that receives, from the first MMS user agent, a request to send a multimedia message to the second MMS user agent. The request includes an identification (ID) number of the second MMS user agent. From a core network, for example, the MMS server obtains an Internet address of the second MMS user agent based on the ID number of the second MMS user agent, if the ID number is not an Internet address of the second MMS user agent. Then the MMS server forwards the Internet address to the first MMS user agent to enable the first MMS user agent to wirelessly deliver the multimedia message directly to the second MMS user agent using the Internet address. Therefore, by not involving a MMS server in delivering multimedia messages, a substantial amount of network resources is saved, and delivery speed of multimedia messages is significantly increased. As a result, the performance of the overall network system is greatly improved.

10 Claims, 4 Drawing Sheets

U.S. PATENT DOCUMENTS

| | | | |
|---|---|---|---|
| 6,549,776 B1* | 4/2003 | Joong | 455/433 |
| 6,587,693 B1* | 7/2003 | Lumme et al. | 455/466 |
| 6,735,441 B1* | 5/2004 | Turgeon et al. | 455/433 |
| 6,757,266 B1* | 6/2004 | Hundscheidt | 370/328 |
| 6,880,019 B1* | 4/2005 | Toyoda | 709/238 |
| 6,885,871 B2* | 4/2005 | Caloud | 455/466 |
| 6,904,055 B2* | 6/2005 | Pichna et al. | 370/467 |
| 6,954,433 B2* | 10/2005 | Chikamatsu et al. | 370/237 |
| 7,218,919 B2* | 5/2007 | Vaananen | 455/412.1 |
| 7,301,934 B1* | 11/2007 | Casati et al. | 370/352 |
| 2001/0028636 A1* | 10/2001 | Skog et al. | 370/328 |
| 2002/0015403 A1* | 2/2002 | McConnell et al. | 370/352 |
| 2003/0076837 A1* | 4/2003 | Whitehill et al. | 370/395.4 |
| 2003/0078982 A1* | 4/2003 | Ogawa | 709/206 |
| 2003/0131008 A1* | 7/2003 | Paulin | 707/100 |
| 2003/0174689 A1* | 9/2003 | Fujino | 370/349 |
| 2003/0226012 A1* | 12/2003 | Asokan et al. | 713/156 |

OTHER PUBLICATIONS

Lars Novak and Magnus Svensson, "MMS—Building on the Successes of SMS", Ericsson, 2001. http://www.ericsson.com/ericsson/corpinfo/publications/review/2001_03/files/2001031.pdf.*

Sevanto, "Multimedia Messaging Service for GPRS and UMTS", IEEE Wireless Communications and Networking Conference, 1999, vol. 3, pp. 1422-1426.*

* cited by examiner

WIRELESS NETWORK SYSTEM FOR EFFICIENTLY DELIVERING MULTIMEDIA MESSAGES

BACKGROUND OF THE INVENTION

The invention relates generally to wireless network communications, and more particularly to wireless network systems and methods for efficiently delivering multimedia messages.

Mobile terminals (e.g., mobile phones, PDAs, etc.) have become a popular means to communicate with other people. Messages in various forms, e.g., voice, text, data, graphics, audio, video, etc., can be sent and received via mobile terminals. As mobile terminals become more and more popular, numerous functions are added and enhanced. One such function is to allow multimedia messages to be communicated between mobile terminals. Multimedia messaging depends on high speed of transmission. With introduction of advanced wireless communications technologies, such as GPRS (General Packet Radio Service) and high speed 3G (Third Generation Mobile System) technologies, sending and receiving multimedia messages have become practical. In sending and receiving multimedia messages, several industry standards have been proposed. One such standard is the Multimedia Messaging Service (MMS), which is defined by the 3GGP (Third Generation Partnership Project) Technical Specifications: 3GPP TS 22.140, 3GPP TS 23.140 and 3GPP TS 26.140. This standard allows users to use mobile terminals that support the MMS standard, and web sites if the web server supports the MMS standard, to send and receive MMS messages via a MMS user agent in formatted text, graphics, photographic images, audio and video clips. A MMS user agent refers to an application residing on a user equipment (UE), a mobile station (MS) or mobile terminal or an external device that performs MMS-specific operations on a user's behalf. Thus, a MMS user agent may be an application residing on a mobile phone or even a web server.

The MMS standard supports standard image formats such as GIF (Graphics Interchange Format) and JPEG (Joint Photographic Expert Group), video formats such as MPEG (Motion Pictures Experts Group) 4, and audio formats such as MP3 (MPEG-1 Audio Layer-3) and MIDI (Musical Instrument Digital Interface). Thus, video sequences, audio clips and high-quality images can be downloaded to the mobile terminals from WAP (Wireless Application Protocol) sites, transferred to the terminals via an attached accessory, such as a digital camera, or received as a MMS message. Photographs, audio and video clips may be stored in the mobile terminals for later use. MMS messages can also be sent either to another MMS-enabled mobile terminals or to an e-mail address.

FIG. 1 shows a MMS reference architecture 10 as defined by 3GPP (Third Generation Partnership Project), which is an organization that develops specifications for a 3G system. In FIG. 1, a MMS relay/server 20 is connected to various elements, including a billing system 32, MMS VAS (value added service) applications 34, MMS user databases 36, a HLR (home location register) 38, and a plurality of external servers 42 to 48 for providing functionalities such as E-mail, fax, SMS, etc. MMS relay/server 20 is also connected to a "foreign" MMS relay/server 40, which is located in a MMSE (Multimedia Messaging Service Environment) different from the MMSE in which MMS relay/server 20 is located. A MMSE refers to a collection of MMS specific network elements under the control of a single administration and may include more than one MMS relay/server. Connection between MMS relays/servers 20 and 40 allows communications between a MMS user agent A in one MMSE and a MMS user agent in another MMSE.

FIG. 2 is a simplified diagram illustrating how a multimedia message (MM) is delivered between two MMS user agents within the same MMSE in a conventional way. A MMS user agent provides the following application layer functionalities: initiating delivery of a MM to another MMS user agent, retrieval of a MM, terminal capability negotiation, and optionally MM composition, MM submission, and MM presentation, etc. A MMS relay/server, on the other hand, is responsible for providing storage, generating notifications and reports, and general handling of messages. A MMS relay/server also provides other functionalities such as generating charging data records (CDR) for billing purposes. In FIG. 2, a MMS user agent A can send a MM to another MMS user agent C and vice versa, via MMS relay/server 20. For example, a MMS user agent A can submit a MM to MMS relay/server 20 via WAP or TCP/IP. MM relay/server 20 will forward the MM to user agent C.

FIG. 3 is a simplified diagram illustrating how a MM is delivered between two MMS user agents located in two different MMSEs in a conventional way. As shown in FIG. 3, a MM user agent A can send a MM to MMS user agent B via MMS relay/server 20 via WAP or TCP/IP. MM relay/server 20 will forward the MM to user agent B via MM relay/server 40.

The conventional ways of delivering MMs between different user agents in the same or different MMSEs, as illustrated above, suffer from serious drawbacks. A main drawback is that it wastes valuable network resources, particularly with respect to MMS relay/servers since the MMS relay/servers are required to process and forward voluminous MMs exchanged among numerous MMS user agents. In other words, all the MMs sent to or pushed from a MMS user agent must go through at least one MMS relay/server. For example, the MMS relay/server will have to receive a MM from a MMS user agent and then forward the same message to another MMS user agent, even if the two MMS user agents are located in the same MMSE. Thus, at least two transactions are required, i.e., delivering a MM by a MMS user agent to a MMS relay/server and then forwarding the same MMS by a MMS relay/server to another MMS user agent. If the two MMS user agents are located in two different MMSEs, an additional transaction is required to transfer the MM from one MMS relay/server and another MMS relay/server. This will inevitably cause significant delays in delivering the MMs. Further, it requires high performance servers with a very large storage capacity since MMs are typically very large in size. This will add considerable costs for the MMS service provider to deploy and maintain the network.

Therefore, there is a need to provide a wireless network system for efficiently delivering MMs that not only saves the valuable network resources, but also speeds up delivery of the MMs between two MMS user agents.

SUMMARY OF THE INVENTION

The present invention provides a wireless network system that enables direct wireless delivery of a multimedia message from a first MMS user agent to a second MMS user agent.

In accordance with one embodiment of the invention, the wireless network system includes a MMS server that receives, from the first MMS user agent, a request to send a multimedia message to the second MMS user agent. The request includes an identification (ID) number of the second MMS user agent. From a core network, for example, the MMS server obtains an Internet address of the second MMS user agent based on the ID number of the second MMS user agent, if the ID number is not an Internet address of the second MMS user agent. Then the MMS server forwards the Internet address to the first MMS user agent to enable the first MMS user agent to wirelessly deliver the multimedia message directly to the second MMS user agent using the Internet address.

Therefore, by not involving a MMS server in delivering multimedia messages, a substantial amount of network resources is saved, and delivery speed of multimedia messages is significantly increased. As a result, the performance of the overall network system is greatly improved.

Other objects and attainments together with a fuller understanding of the invention will become apparent and appreciated by referring to the following description and claims taken in conjunction with the accompanying drawings.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE PREFERRED EMBODIMENTS

Figure 1:
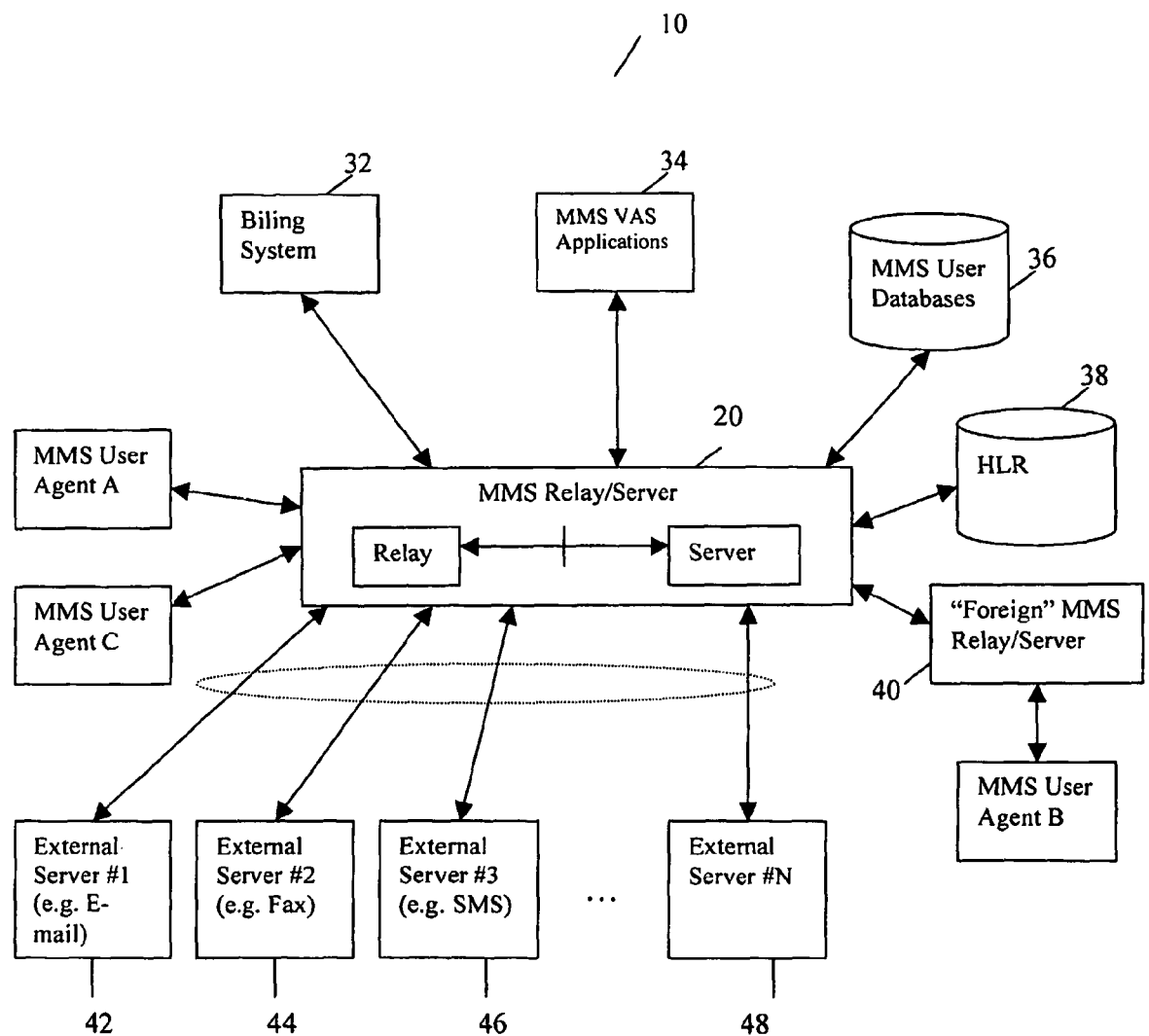
FIG. 1 shows a MMS reference architecture as defined by 3GPP.
Figure 2:
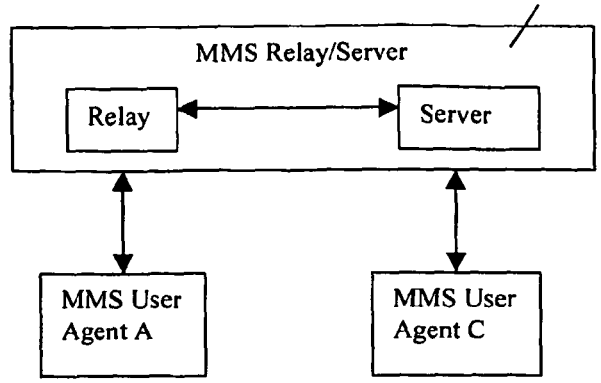
FIG. 2 is a simplified diagram illustrating how a MM is delivered between two MMS user agents within the same MMSE in a conventional way.
Figure 3:
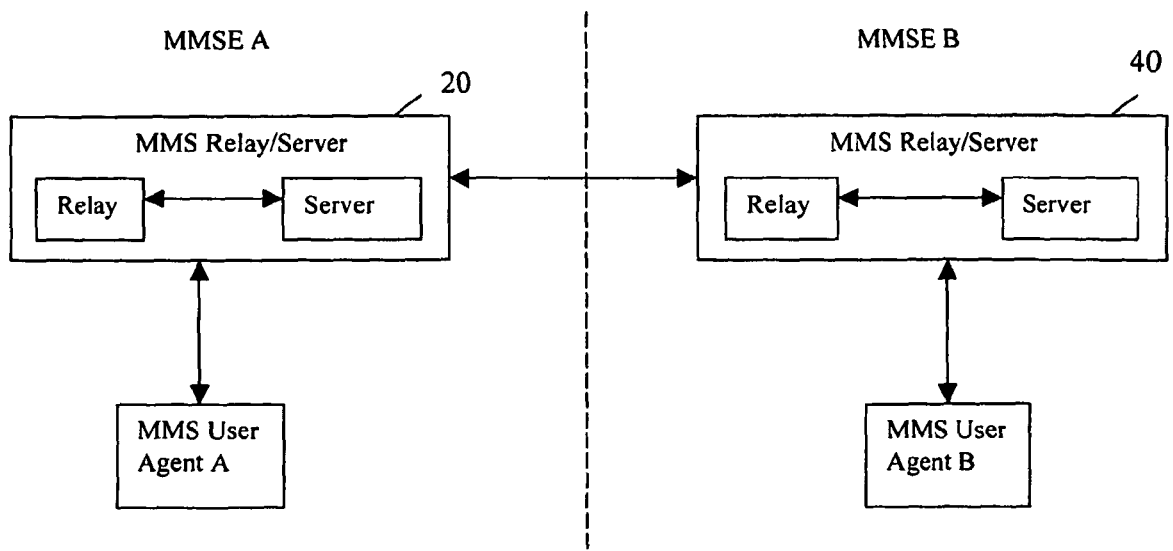
FIG. 3 is a simplified diagram illustrating how a MM is delivered between two MMS user agents located in two different MMSEs in a conventional way.
Figure 4:
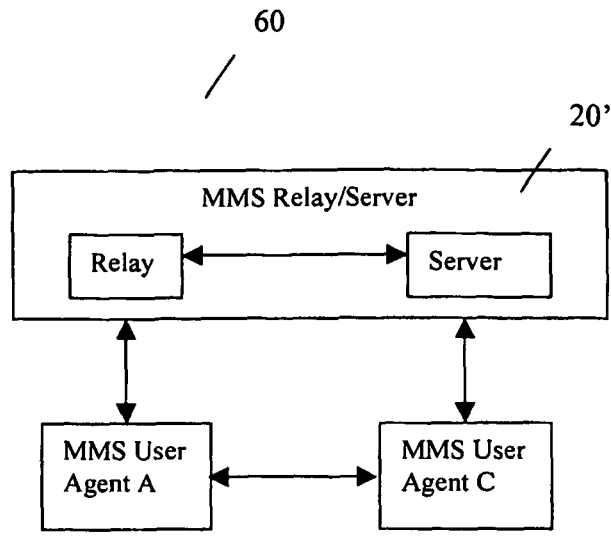
FIG. 4 is a simplified diagram showing a two-way wireless messaging system according to a first embodiment of the invention.

FIG. 4 is a simplified diagram showing a two-way wireless messaging system 60 according to a first embodiment of the invention. In system 60, a MMS relay/server 20' serves two MMS user agents A and C (e.g., two mobile phones or one web site and one mobile phone) located within the same MMSE. By using peer-to-peer technology, MMS user agent A can directly deliver MM contents to MMS user agent C and vice versa, without going through MMS relay/server 20'. For MMS messaging, MMS relay/server 20' is involved only in the recipient's address resolution, billing and authentication. In this way, the network operator can save huge amount of network resources resulting in substantial savings, while may still be able to charge the same fees to MMS users.

Figure 5:
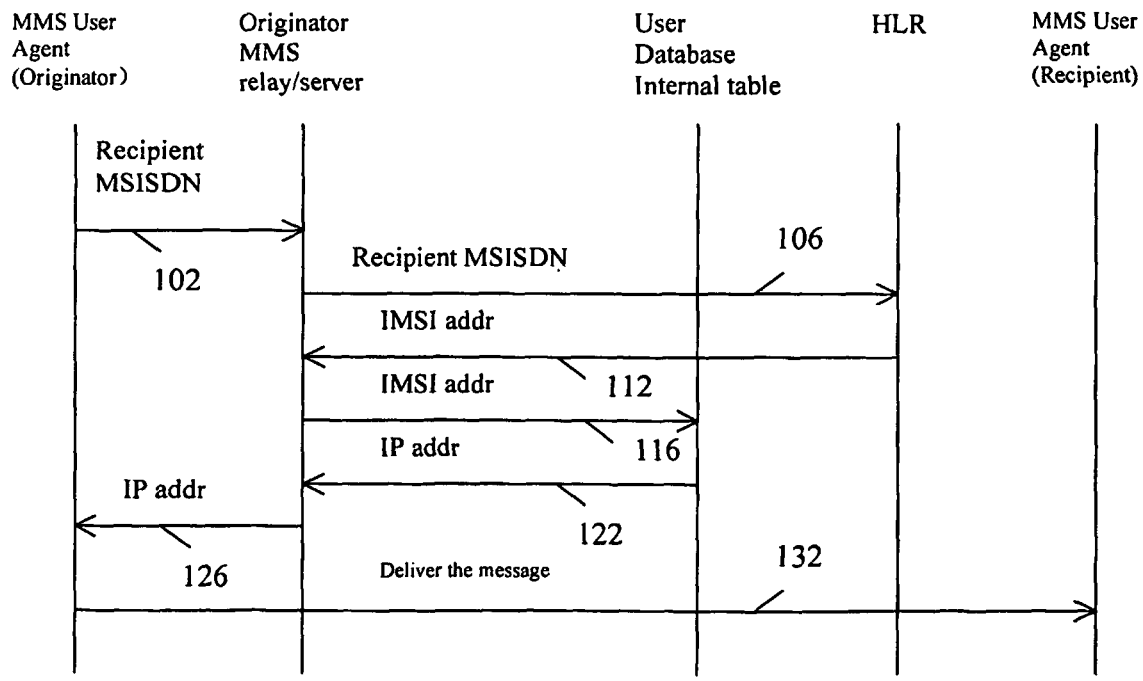
FIG. 5 shows how a recipient's IP address is resolved by using the recipient's MSISDN in the wireless network system in FIG. 4.

To enable peer-to-peer delivery of MMs, several approaches are available. In a preferred embodiment of the invention, the IP (Internet Protocol) based packet switched wireless network system (e.g., IP based GPRS network system) is used, and the recipient's IP address is resolved by using its unique MSISDN (Mobile Station International ISDN Number), as illustrated in FIG. 5. For a mobile phone, its unique MSISDN is the associated telephone number. For wireless based web sites, their allocated IP addresses are used directly.

As shown in FIG. 5, an originating MMS user agent referred to as originator (e.g., MMS user agent A) sends a request to an originator MMS relay/server (e.g., MMS relay/server 20') to obtain the MSISDN of a receiving MMS user agent referred to as recipient (e.g., MMS user agent C) (step 102). Upon receiving the request from the originator, the MMS relay/server sends a request for the corresponding IMSI (International Mobile Subscriber Identity) address to the HLR (step 106), which stores the mapping table for MSISDN to IMSI. The IMSI address is used by the network system to uniquely identify a user agent and corresponds to the MSISDN on a one-to-one basis, as illustrated in Table 1. In response to the request, the HLR returns the IMSI address to the MMS relay/server (step 112).

TABLE 1

An exemplary format of the mapping table for IMSI to MSISDN

| IMSI | MSISDN | Other Data |
|---|---|---|
| 310-68-4451000 | 813-567-1234 | ... |
| 310-68-4451001 | 813-567-4355 | |
| 310-68-4451002 | 813-567-8479 | |
| ... | ... | |

After receiving the IMSI address, the MMS relay/server sends a request with the IMSI address to the user databases or an internal table in the core network (e.g., in the GGSN (Gateway GPRS Support Node) or the HLR) in order to obtain the recipient's IP address (step 116). IP addresses corresponding to the IMSI of a wireless device may be configured in the user databases or internal table. If the IP address can be found for the recipient from the user databases or internal table, as illustrated in Table 2, the address will be returned to the MMS relay/server (step 122), which will forward it to the originator (step 126). After receiving the IP address, the originator can directly deliver the message contents to the recipient by using the known IP technology (step 132).

TABLE 2

An exemplary format of relevant portions of user databases/internal table

| IP address | IMSI | Other data |
|---|---|---|
| 172.31.1.2 | 310-68-4451000 | ... |
| 172.31.1.3 | 310-68-4451001 | |
| 172.31.1.4 | 310-68-4451002 | |
| ... | ... | |

On the other hand, if no corresponding IP address is found for the recipient in the user database or the internal table, it may be because the recipient's terminal doesn't support the IP technology or because it is simply powered off. In such case, the MMS relay/server will inform the originator, and the originator will deliver the message contents in a conventional way.

In the above, the terminal capability negotiation for determining whether a specific standard (e.g., JPEG) is supported by the recipient would be based on the Internet standard (e.g. CC/PP (Composite Capability/Preference Profiles)), and can follow the standard IP based MMS implementation. Further, the originator MMS relay/server can collect the billing information for sending the MM at the time of contacting the HLR and other network nodes for the information of recipient.

Figure 6:
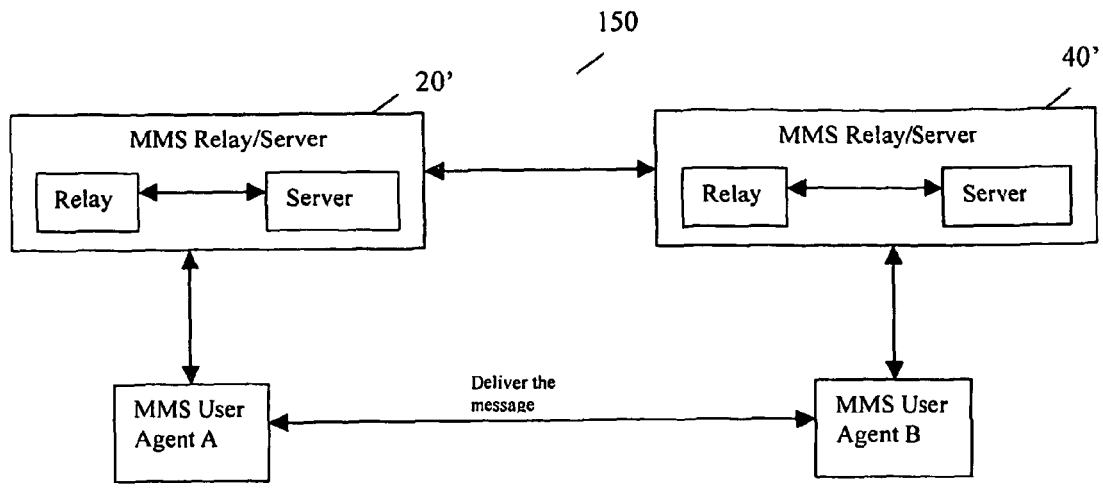
FIG. 6 is a simplified diagram showing a two-way wireless messaging system according to a second embodiment of the invention.

FIG. 6 is a simplified diagram showing a two-way wireless messaging system 150 according to a second embodiment of the invention. In system 150, MMS user agents A and B are respectively served by two MMS relays/servers 20' and 40' respectively located in MMSE's A and B. Preferably, the two MMSE's are connected to an IP network and operated by the same telecom operator to ensure that the same mechanism for IP address allocation is used. By using peer-to-peer technology, MMS user agent A can directly deliver MM contents to MMS user agent B and vice versa, without going through the two MMS relays/servers. Like the first embodiment in FIG. 4, for MMS messaging, MMS relays/servers 20' and 40' are involved only in the recipient's address resolution, billing and authentication. As a result, a huge amount of network resources can be saved with substantial savings. In the meantime, the network operator may still be able to charge the same fees to MMS users.

Figure 7:
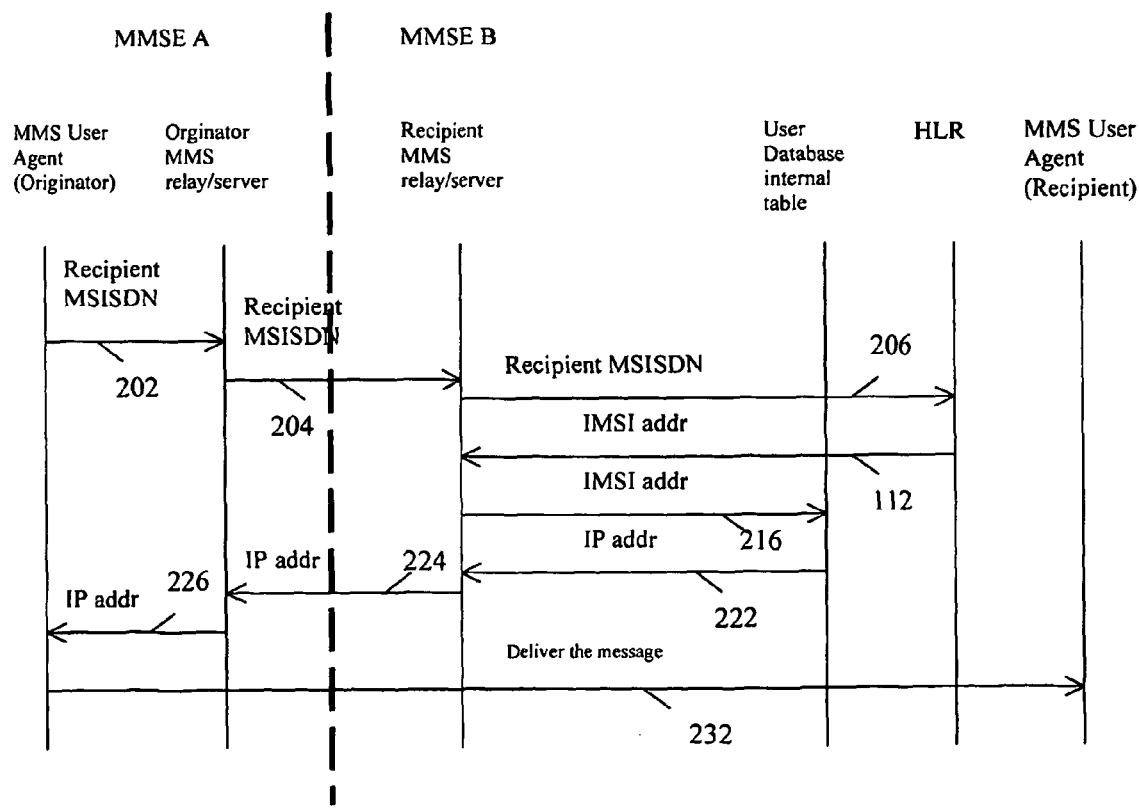
FIG. 7 shows how a recipient's IP address is resolved by using the recipient's MSISDN in the wireless network system in FIG. 6.

FIG. 7 shows how the recipient's IP address is resolved by using the recipient's MSISDN in the wireless network system illustrated in FIG. 6. In this case, the originator MMS relay/server relays all requests from the originator to the recipient (step 204), and relays all responses from the recipient MMS relay/server to the originator (step 224). All other steps are similar to the corresponding steps illustrated in FIG. 5. Therefore, for simplicity the detailed descriptions of these steps are omitted.

In the above, the embodiments of the invention are described in connection with a GPRS network system in which the network layer is based on the IP protocol. In fact, any wireless network system with a MMS implementation in which the underlying network layer is IP based can be used to implement the invention. Such examples include IP based MMS implementation and WAP based MMS implementation on top of IP protocol. Since the 3G wireless network systems (e.g., CDMA2000, TD-SCDMA, WCDMA) will be based on the IP protocol, the 3G systems can also be used to implement the invention.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A wireless network system that enables direct wireless delivery of a multimedia message from a first multimedia messaging service (MMS) user agent to a second MMS user agent, the system comprising:

an originator MMS relay/server that comprises a relay and a server configured to receive, from the first MMS user agent, a request to send a multimedia message to the second MMS user agent, the request including a mobile station international ISDN number (MSISDN) of the second MMS user agent;

the server of the originator MMS relay/server configured to obtain an Internet address of the second MMS user agent directly from a core network based on the MSISDN of the second MMS user agent, if the MSISDN is not an Internet address of the second MMS user agent; and the relay of the originator MMS relay/server configured to forward the obtained Internet address to the first MMS user agent, wherein responsive to receipt of the obtained Internet address, the first MMS user agent is configured to use peer-to-peer delivery of multimedia messages enable via an Internet Protocol based packet switched wireless network system to directly wirelessly deliver message content of the multimedia message to the second MMS user agent using the obtained Internet address, while (i) involving the originator MMS relay/server only in (i)(a) the second MMS user agent Internet address resolution, (i)(b) collecting billing information for sending the multimedia message at a time of contacting a home location register (HLR) or other network nodes for Internet address information of the second MMS user agent, and (i)(c) authentication and (ii) wirelessly delivering the message content of the multimedia message to the second MMS user agent without involving the originator MMS relay/server in the delivering of the message content of the multimedia message;

wherein the server of the originator MMS relay/server is further configured to (i) send the MSISDN of the second MMS user agent directly to the HLR in the core network, (ii) obtain an international mobile subscriber identity (IMSI) address corresponding to the MSISDN of the second MMS user agent directly from the HLR in the core network, (iii) send the obtained IMSI address directly to a user database internal table in the core network, and (iv) obtain the Internet address corresponding to the IMSI directly from the user database internal table in the core network.

2. The system of claim 1, the wireless network system is implemented in an Internet Protocol (IP) based network.

3. A wireless network system for enabling direct wireless delivery of a multimedia message from a first multimedia messaging service (MMS) user agent located in a first multimedia messaging service environment (MMSE) to a second MMS user agent located in a second MMSE, the system comprising:

a first MMS relay/server located in the first MMSE; and
a second MMS relay/server located in the second MMSE;
wherein the first MMS relay/server includes: a relay and a server of the first MMS relay/server configured to receive, from the first MMS user agent, a request to send a multimedia message to the second MMS user agent, the request including an identification (ID) number of the second MMS user agent, and the relay of the first MMS relay/server configured to forward the request directly to the second MMS server;
wherein the second MMS relay/server includes: a server of the second MMS relay/server configured to obtain an Internet address of the second MMS user agent based on the ID number of the second MMS user agent, if the ID number is not an Internet address of the second MMS user agent; and a relay of the second MMS relay/server configured to forward the obtained Internet address of the second MMS user agent directly to the first MMS relay/server;
wherein the relay of the first MMS relay/server is further configured to forward the obtained Internet address received from the second MMS relay/server directly to the first MMS user agent, further wherein responsive to receipt of the obtained Internet address, the first MMS user agent is configured to use peer-to-peer delivery of multimedia messages enabled via Internet Protocol based packet switched wireless network system to directly wirelessly deliver message content of the multimedia message to the second MMS user agent using the obtained Internet address, while (i) involving the first and the second MMS relay/servers only in (i)(a) the second MMS user agent Internet address resolution, (i)

(b) collecting billing information for sending the multimedia message at a time of contacting a home location register (HLR) or other network nodes for Internet address information of the second MMS user agent, and (i)(c) authentication and (ii) wirelessly delivering the message content of the multimedia message to the second MMS user agent without involving the first and the second MMS relay/servers in the delivering of the message content of the multimedia message;

wherein the server of the second MMS relay/server is further configured to (i) send the ID number of the second MMS user agent directly to the HLR of the core network, (ii) obtain an international mobile subscriber identity (IMSI) address corresponding to the ID number of the second MMS user agent directly from the HLR of the core network, (iii) send the obtained IMSI address directly to a user database internal table in the core network, and (iv) obtain the Internet address corresponding to the IMSI directly from the user database internal table in the core network.

4. The system of claim 3, wherein the identification number is a mobile station international ISDN number (MSISDN).

5. The system of claim 3, the wireless network system is implemented in an Internet Protocol (IP) based network.

6. A method for enabling direct wireless delivery of a multimedia message from a first multimedia messaging service (MMS) user agent to a second MMS user agent, the method comprising the steps of:

(a) receiving from the first MMS user agent a request to send a multimedia message to the second MMS user agent, the request including a mobile station international ISDN number (MSISDN) of the second MMS user agent;

(b) obtaining an Internet address of the second MMS user agent directly from a core network based on the MSISDN of the second MMS user agent, if the MSISDN is not an Internet address of the second MMS user agent; and (c) forwarding the obtained Internet address to the first MMS user agent, wherein responsive to receipt of the obtained Internet address, the first MMS user agent uses peer-to-peer delivery of multimedia messages enabled via an Internet Protocol based packet switched wireless network system to directly wirelessly deliver message content of the multimedia message to the second MMS user agent using the obtained Internet address, while (i) involving an originator MMS relay/server only in (i)(a) the second MMS user agent Internet address resolution, (i)(b) collecting billing information for sending the multimedia messages at a time of contacting a home location register (HLR) or other network nodes for internet address information of the second MMS user agent, and (i)(c) authentication and (ii) wirelessly delivering the message content of the multimedia message to the second MMS user agent without involving the originator MMS relay/server in the delivering of the message content of the multimedia message;

wherein step (b) includes: (i) sending the MSISDN of the second MMS user agent directly to the HLR in the core network of a wireless network system, (ii) obtaining an international mobile subscriber identity (IMSI) address corresponding to the MSISDN of the second MMS user agent directly from the HLR in the core network, (iii) sending the obtained IMSI address directly to a user database internal table in the core network, and (iv) obtaining the Internet address corresponding to the IMSI directly from the user database internal table in the core network.

7. The method of claim 6, wherein the method is implemented in an Internet Protocol (IP) based network.

8. A method for enabling direct wireless delivery of message content of a multimedia message from a first multimedia messaging service (MMS) user agent located in a first multimedia messaging service environment (MMSE) to a second MMS user agent located in a second MMSE, the method comprising the steps of:

(a) receiving, by a first MMS relay/server located in the first MMSE, from the first MMS user agent a request to send a multimedia message to the second MMS user agent, the request including an identification (ID) number of the second MMS user agent;

(b) forwarding the request from the first MMS relay/server directly to a second MMS relay/server located in the second MMSE;

(c) obtaining, by the second MMS relay/server, an Internet address of the second MMS user agent based on the ID number of the second MMS user agent, if the ID number is not an Internet address of the second MMS user agent;

(d) forwarding, by the second MMS relay/server, the obtained Internet address of the second MMS user agent directly to the first MMS relay/server; and (e) forwarding, by the first MMS relay/server, the obtained Internet address directly to the first MMS user agent, wherein responsive to receipt of the obtained Internet address, the first MMS user agent uses peer-to-peer delivery of multimedia messages enabled via an Internet Protocol based packet switched wireless network system to directly wirelessly deliver the message content of the multimedia message to the second MMS user agent using the obtained Internet address, while (i) involving the first and the second MMS relay/servers only in (i)(a) the second MMS user agent Internet address resolution, (i)(b) collecting billing information for sending the multimedia messages at a time of contacting a home location register (HLR) or other network nodes for Internet address information of the second MMS user agent, and (i)(c) authentication and (ii) wirelessly delivering the message content of the multimedia message to the second MMS user agent without involving the first and the second MMS relay/servers in the delivering of the message content of the multimedia message;

wherein the obtaining by the second MMS relay/server (i) sends the ID number of the second MMS user agent directly to the HLR of the core network, (ii) obtains an international mobile subscriber identity (IMSI) address corresponding to the ID number of the second MMS user agent directly from the HLR of the core network, (iii) sends the obtained IMSI address directly to a user database internal table in the core network, and (iv) obtains the Internet address corresponding to the IMSI directly from the user database internal table in the core network.

9. The method of claim 8, wherein the identification number is a mobile station international ISDN number (MSISDN).

10. The method of claim 8, wherein the method is implemented in an Internet Protocol (IP) based network.

* * * * *